(12) United States Patent
Komori

(10) Patent No.: US 7,648,283 B2
(45) Date of Patent: Jan. 19, 2010

(54) BEARING APPARATUS FOR A WHEEL OF VEHICLE

(75) Inventor: Kazuo Komori, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/052,067

(22) Filed: Mar. 20, 2008

(65) Prior Publication Data
US 2008/0199122 A1 Aug. 21, 2008

Related U.S. Application Data

(63) Continuation of application No. PCT/JP2006/318605, filed on Sep. 20, 2006.

(30) Foreign Application Priority Data

Sep. 20, 2005 (JP) ............................. 2005-271532

(51) Int. Cl.
F16C 33/64 (2006.01)
(52) U.S. Cl. ..................... 384/513; 384/506; 384/544
(58) Field of Classification Search ................. 384/500, 384/502–506, 510–516, 544, 559, 564; 29/898.061, 29/898.062
See application file for complete search history.

(56) References Cited

U.S. PATENT DOCUMENTS 4,039,231 A * 8/1977 Di Loreto ................... 384/516
4,700,443 A * 10/1987 Schalk ................... 29/898.061
5,051,004 A * 9/1991 Takeuchi et al. ............ 384/516
5,175,931 A * 1/1993 Ito ......................... 29/898.061
6,428,214 B2 * 8/2002 Tajima et al. ............... 384/544

FOREIGN PATENT DOCUMENTS

| JP | 2000-071705 A | | 3/2000 |
| JP | 2000-110839 A | | 4/2000 |
| JP | 2001-193745 A | | 7/2001 |
| JP | 2005140181 A | * | 6/2005 |

* cited by examiner

Primary Examiner—Thomas R Hannon
(74) Attorney, Agent, or Firm—Harness, Dickey & Pierce, P.L.C.

(57) ABSTRACT

A vehicle wheel bearing apparatus has an outer member formed with double row outer raceway surfaces on its inner circumferential surface. Inner members are each formed with inner raceway surfaces on their outer circumferential surface. The inner raceway surfaces face opposite to the double row outer raceway surfaces. Double row balls are freely rollably contained between the outer raceway surfaces and inner raceway surfaces. A counter portion is formed near the bottom of each inner raceway surface. The counter portion has an outer diameter larger than, by a run-over height, a diameter of the bottom of each inner raceway surface. The counter portion is formed by a cylindrical portion that axially extends from each inner raceway surface. A tapered portion converges toward the end face of each inner member. Transitions between the counter portion and the inner raceway surface as well as between the cylindrical portion and the tapered portion are rounded and smoothly continuous.

5 Claims, 4 Drawing Sheets

[ FIG. 1 ]
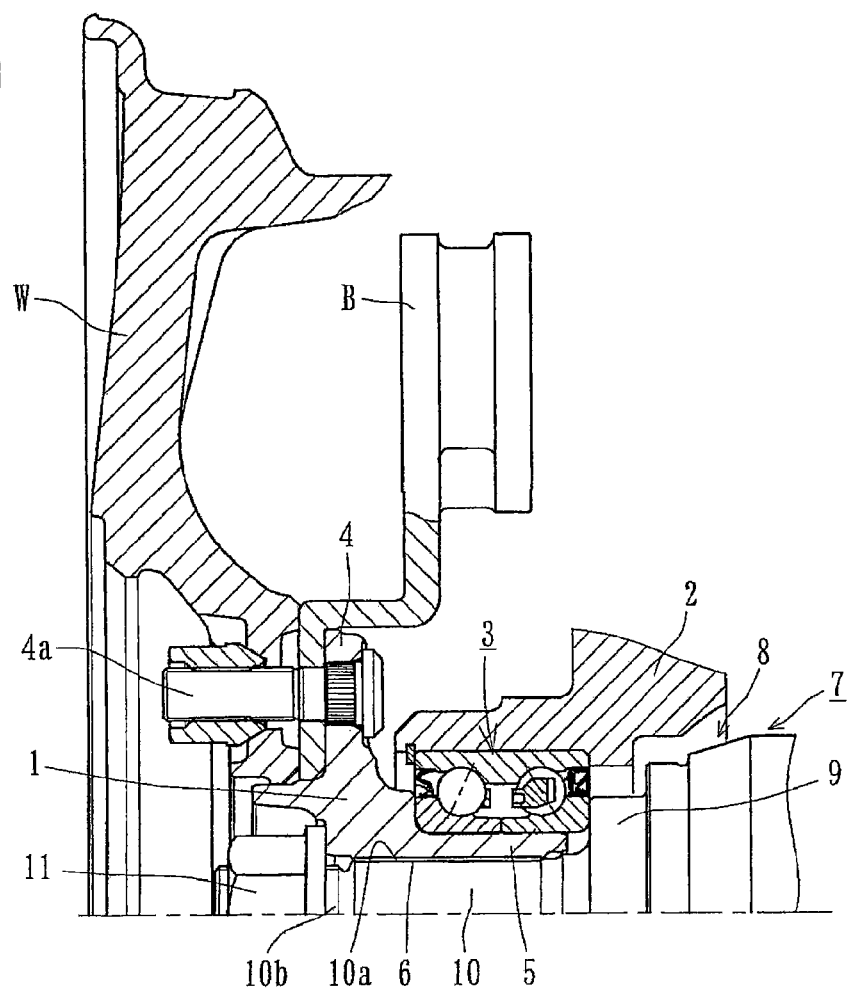
[ FIG. 2 ]
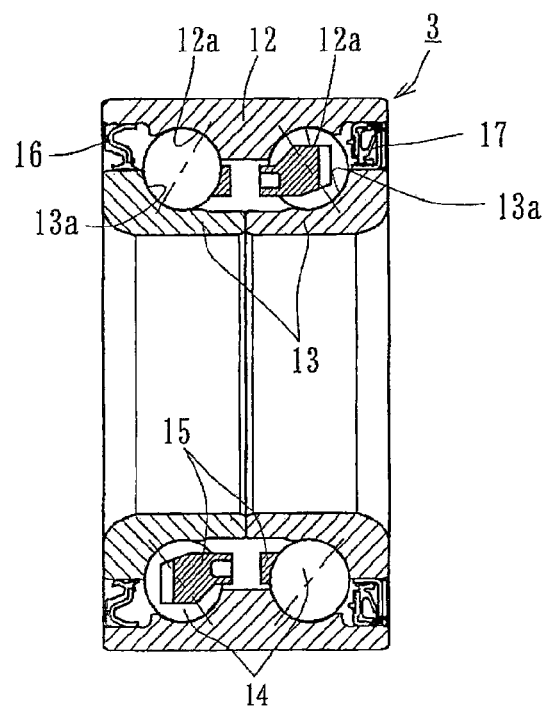

[ FIG. 3 ]
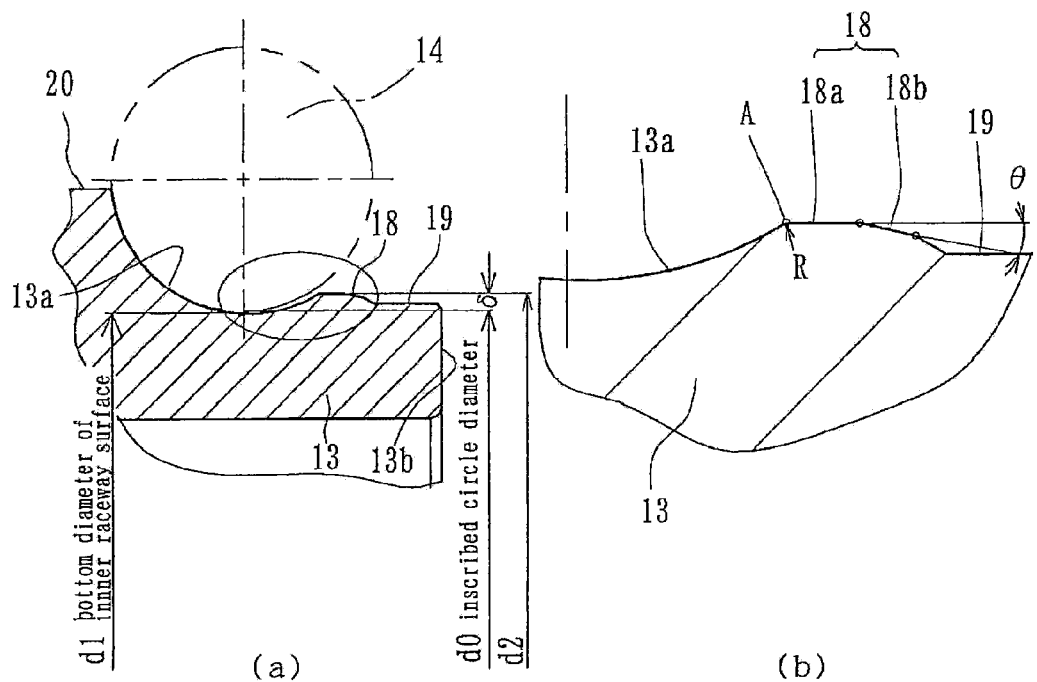
(a)　　　　　　　　　　　(b)
[ FIG. 4 ]
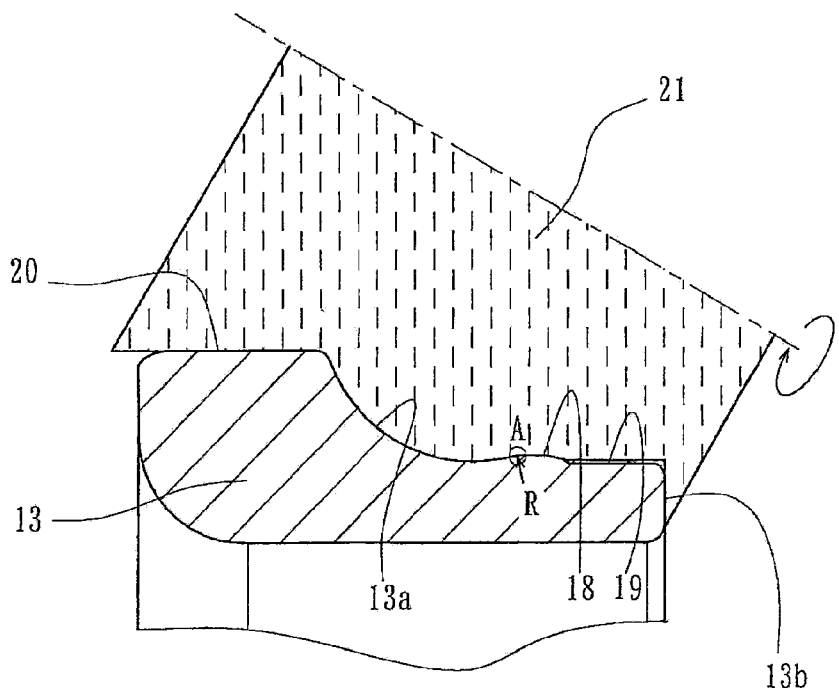

[ FIG. 5 ]
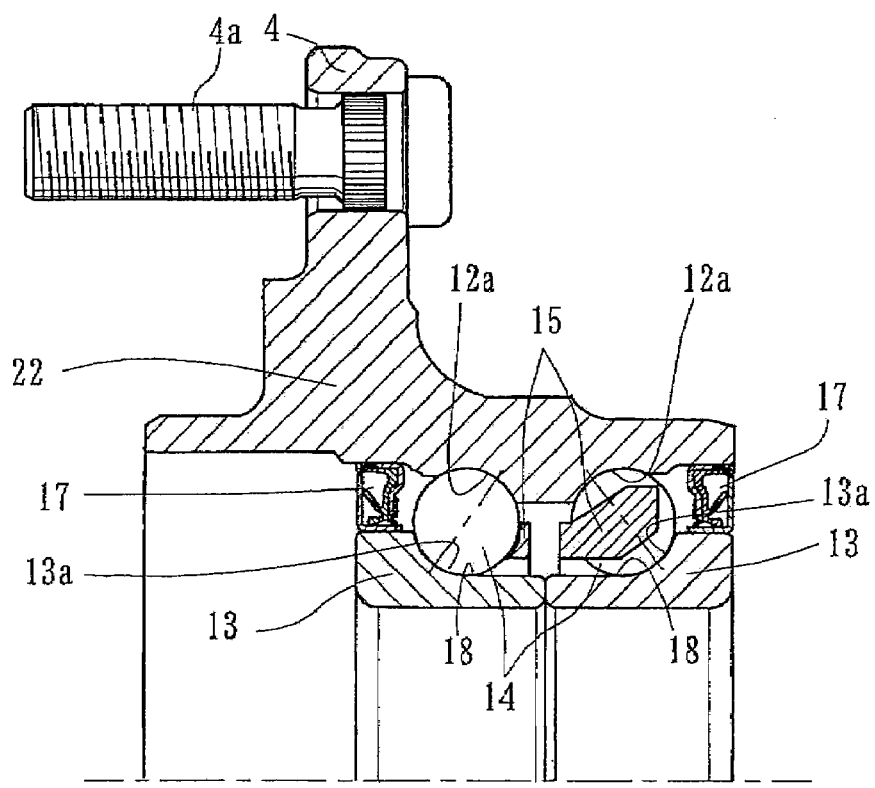
[ FIG. 6 ]
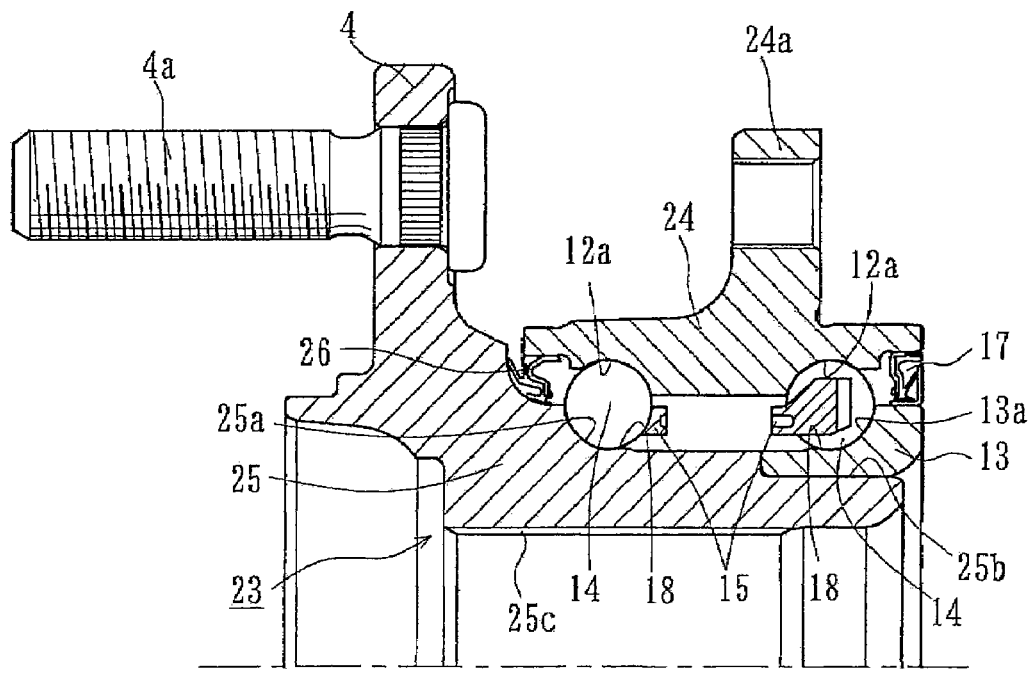

[ FIG. 7 ]
PRIOR ART
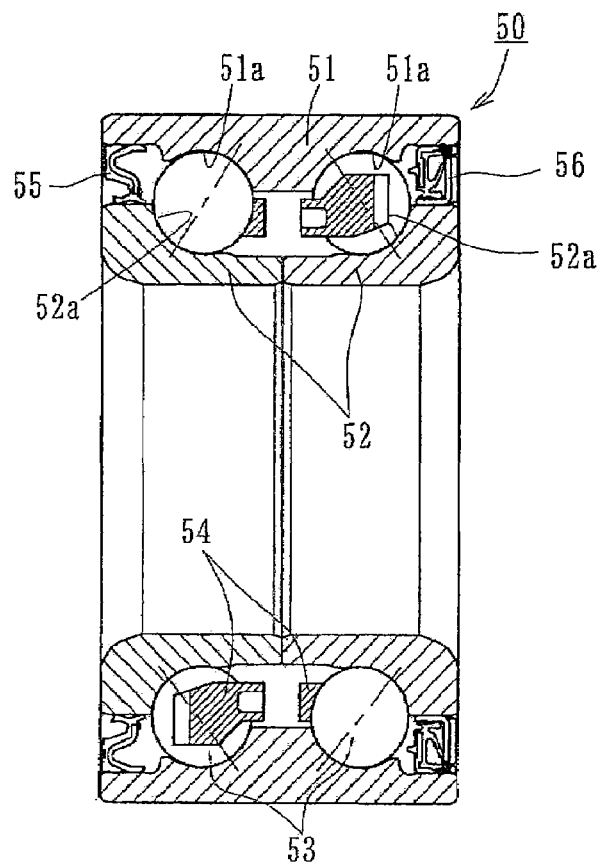
[ FIG. 8 ]
PRIOR ART
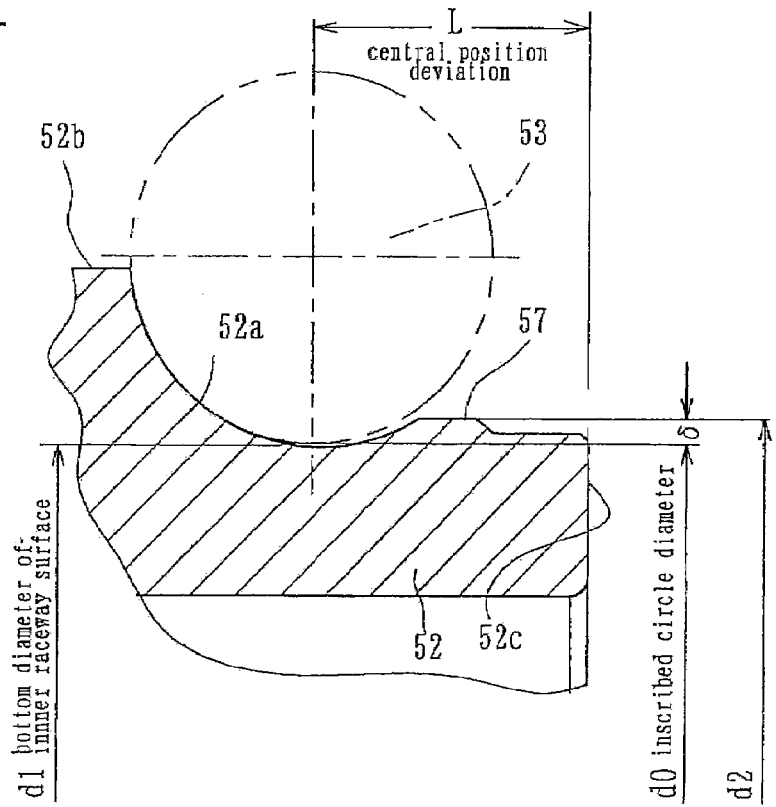

BEARING APPARATUS FOR A WHEEL OF VEHICLE

CROSS-REFERENCE TO RELATED APPLICATIONS

This application is a continuation of International Application No. PCT/JP2006/318605, filed Sep. 20, 2006, which claims priority to JP 2005-271532, filed Sep. 20, 2005. The disclosures of the above applications are incorporated herein by reference.

FIELD

The present disclosure relates to a bearing apparatus to freely rotatably support a vehicle wheel and, more particularly, to a vehicle wheel bearing apparatus that prevents damage caused to the balls (ball damage) of the bearing apparatus when they are run-over during assembly of the bearing apparatus. Also, the disclosure reduces noise generation in the bearing apparatus to improve its life.

BACKGROUND

The bearing apparatus for vehicle wheel is adapted to freely rotatably support a wheel hub to mount the wheel, via a rolling bearing. An inner ring rotation type is used for a driving wheel and both inner ring rotation and outer ring rotation types for a driven wheel. A double row angular ball bearing is widely used in such a bearing apparatus. Reasons for this is that it has a desirable bearing rigidity, high durability against misalignment and small rotation torque required for fuel consumption. The double row angular contact ball bearing has a plurality of balls interposed between a stationary ring and a rotational ring. The balls are contacted with the stationary and rotational rings with a predetermined contact angle.

The vehicle wheel bearing apparatus is broadly classified into a first, second and third generation type. Structure of the first generation includes a wheel bearing of double row angular contact ball bearing fit between a knuckle that forms part of a suspension and a wheel hub. Structure of the second generation includes a body mounting flange or a wheel mounting flange directly formed onto the outer circumferential surface of an outer member (outer ring). Structure of the third generation includes one of the inner raceway surfaces directly formed on the outer circumferential surface of the wheel hub.

Recently, there has been a strong desire for the bearing apparatus for a vehicle wheel not only to improve durability and cost reduction but to improve NVH (i.e. Noise, Vibration and Harshness). FIG. 7 illustrates a prior art wheel bearing 50 used for a vehicle wheel bearing apparatus. The bearing 50 has a double row angular contact ball bearing comprising an outer ring 51 formed on its inner circumferential surface with double row outer raceway surfaces 51a, 51a. A pair of inner rings 52, 52 are each formed on their outer circumferential surface with an inner raceway surface 52a oppositely facing each of the outer raceway surfaces 51a, 51a. A plurality of balls 53, 53 is contained between the inner and outer raceway surfaces. Cages 54 rotatably hold the balls 53. Seals 55, 56 are arranged in an annular space between the outer ring 51 and inner rings 52, 52 to prevent leakage of lubricating grease sealed within the bearing and ingress of dust or rain water into the bearing from the outside.

Such a bearing 50 is called a first generation bearing. The bearing 50 has counter portions (projections) 57, shown in an enlarged view of FIG. 8, formed near the bottom of the inner raceway surfaces 52a of the inner rings 52. Additionally, the bearing has an outer diameter larger than a diameter (d1) of the bottom of the inner raceway surface 52a. Accordingly, balls 53 interfere with the counter portions 57 when the inner rings 52 are moved axially. Thus, the balls 53 coming out of the inner rings 52 is prevented by the counter portions 57. That is, the outer diameter (d2) of the counter portion 57 of the inner ring 52 is larger than the inscribed circle diameter (d0) of the balls under a supposed condition where the balls 53 are perfectly held within the outer raceway surface 51a as if they would be contacted with the bottom of the outer raceway surface 51a. Accordingly a so-called "run-over height" δ (one side) is provided.

In addition, all of the outer circumferential surface of a shoulder 52b of the inner ring 52, the inner raceway surface 52a, the counter portion 57, and a small end face 52c are simultaneously ground by a formed grinding wheel. Furthermore, attempts have been made to minimize a setting range of the initial gap and to reduce the dispersion amount of bearing preload by minimizing the respective dimensional dispersion as well as by limiting the run-over height δ and the central position deviation (L) (i.e., a distance between the bottom of the inner raceway surface 52a and the small end face 52c) to a predetermined value range (see e.g. Japanese laid-open Patent publication No. 193745/2001).

SUMMARY

In the single row angular contact ball bearing, assembly of the bearing can be easily achieved if the run-over height δ is small, however, the inner ring may easily come out. On the contrary, if the run-over height δ is large, the assembly of the bearing will become difficult and it is possible that "run-over damage" (or "ball damage") would be caused to the balls during assembly of the bearing. According to the prior art wheel bearing 50, since all of the outer circumferential surface of the shoulder 52b of the inner ring 52, the inner raceway surface 52a, the counter portion 57, and a small end face 52c are simultaneously ground by a formed grinding wheel and the run-over height δ and the central position deviation (L) is limited to a predetermined value range, it is possible to minimize a setting range of the initial gap and thus to reduce the dispersion of the amount of preload. However it is still impossible to effectively prevent the generation of the run-out damage (ball damage).

Accordingly, in addition to these problems the prior art wheel bearing 50 often causes problems with contact of the balls and the edge of the counter portions 57 during transportation of the wheel bearing or assembly of the wheel bearing to the vehicle wheel bearing apparatus. Contact of the balls 53 against the counter portions 57 causes ball damage especially when heavy shock or vibration is applied to the wheel bearing. In addition, since the radially inner portions of the balls 53 run over the straight portion of the counter portion 57 during assembly of the wheel bearing 50, micro scratch damages often occurs. This scratch damage to the balls 53 causes an NVH problem and also reduces the life of the bearing.

It is, therefore, an object of the present disclosure to provide a vehicle wheel bearing apparatus that prevents the generation of ball damages and NVH problems and can improve the life of bearing apparatus.

According to an object of the disclosure, a vehicle wheel bearing apparatus comprises an outer member with double row outer raceway surfaces formed on its inner circumferential surface. Inner members are each formed with an inner raceway surface on its outer circumferential surface. The double row inner raceway surfaces are opposite to the double row outer raceway surfaces. Double row balls are freely rollably contained between the outer raceway surfaces and the inner raceway surfaces. A counter portion is formed near the bottom of each inner raceway surface having an outer diameter larger by a run-over height than a diameter of the bottom of each inner raceway surface. The counter portion is formed by a cylindrical portion axially extending from each inner raceway surface. A tapered portion converges toward the end face of each inner member. Transition portions between the counter portion and the inner raceway surface as well as between the cylindrical portion and the tapered portion are rounded, continuous and smooth.

The counter portion is formed near the bottom of each inner raceway surface with an outer diameter larger than, by a run-over height, a diameter of the bottom of each inner raceway surface. The counter portion is formed by a cylindrical portion axially extending from each inner raceway surface. The tapered portion converges toward the end face of each inner member. Transitions between the counter portion and the inner raceway surface as well as between the cylindrical portion and the tapered portion are rounded, continuous and smooth. Thus, it is possible to provide a vehicle wheel bearing apparatus that can prevent the generation of ball damage and contact of the balls against the edge of the counter portion during transportation of the wheel bearing and assembly of the wheel bearing to the vehicle wheel bearing apparatus. Thus, the bearing can prevent NVH problems and improve the life of bearing apparatus.

The counter portion, formed by a grinding wheel, may be ground simultaneously with the inner raceway surface. This makes it possible to form a counter portion with a smooth surface without any corner or edge. This prevents the generation of burrs.

The outer diameter of the counter portion may be limited within a predetermined value range so that the run-over height of the counter portion is included within a predetermined tolerance range. This suppresses ball damage.

The angle of inclination of the tapered surface may be set at or less than 5°. This makes it possible to smoothly lead the ball from the tapered surface to the cylindrical portion of the counter portion. Thus, this effectively prevents the generation of scratch damage on the balls during assembly of the wheel bearing.

The inner member may comprise a wheel hub with an integrally formed wheel mounting flange at one end. The inner member is formed with one inner raceway surface on its outer circumferential surface. The inner raceway surface is opposite to one of the double row outer raceway surfaces. A cylindrical portion axially extends from the inner raceway surface. An inner ring is positioned on the cylinder portion. The inner ring is formed with an inner raceway surface on its outer circumferential surface. The inner raceway surface oppositely faces the other double row outer raceway surfaces. The counter portion may be formed on the inner raceway surfaces of the wheel hub and the inner ring, respectively. This makes it possible to prevent the generation of ball damage, run-over damage or scratch damage to the balls during assembly of the wheel bearing. It is also possible to seek out the bottom diameter of the inner raceway surface with high accuracy in a short time and improve the workability.

The vehicle wheel bearing apparatus comprises an outer member formed with double row outer raceway surfaces on its inner circumferential surface. Inner members are each formed with inner raceway surfaces on their outer circumferential surface. The double row inner raceway surfaces are opposite to the double row outer raceway surfaces. Double row balls are freely rollably contained between the outer raceway surfaces and inner raceway surfaces. A counter portion is formed near the bottom of each inner raceway surface with an outer diameter larger than, by a run-over height, diameter of the bottom of each inner raceway surface. The counter portion is formed by a cylindrical portion axially extending from each inner raceway surface. A tapered portion converges toward the end face of each inner member. Transitions formed between the counter portion and the inner raceway surface as well as between the cylindrical portion and the tapered portion are rounded and smoothly continued. Accordingly, it is possible to provide a vehicle wheel bearing apparatus that can prevent the generation ball damage and contact of the balls against the edge of the counter portion during transportation of the wheel bearing and assembly of the wheel bearing to the vehicle wheel bearing apparatus. Thus, it can prevent NVH problems and improve the life of bearing apparatus.

A vehicle wheel bearing apparatus comprises an outer member formed with double row outer raceway surfaces on its inner circumferential surface. Inner members are each formed with inner raceway surfaces on its outer circumferential surface. The double row inner raceway surfaces are opposite to the double row outer raceway surfaces. Double row balls are freely rollably contained between the outer raceway surfaces and inner raceway surfaces. A counter portion is formed near the bottom of each inner raceway surface with an outer diameter larger by a run-over height, than a diameter of the bottom of each inner raceway surface. The counter portion is formed by a cylindrical portion axially extending from each inner raceway surface. A tapered portion converges toward the end face of each inner member. Transitions formed between the counter portion and the inner raceway surface as well as between the cylindrical portion and the tapered portion are rounded and smoothly continued.

DRAWINGS

Additional advantages and features of the present disclosure will become apparent from the subsequent description and the appended claims, taken in conjunction with the accompanying drawings, wherein:

FIG. 1 is a longitudinal section view of a first embodiment of the vehicle wheel bearing apparatus.

FIG. 2 is a longitudinal section view of a wheel bearing of FIG. 1.

FIG. 3(a) is a partial enlarged view of FIG. 2.

FIG. 3(b) is a further partial enlarged view of FIG. 3(a).

FIG. 4 is a schematic view showing a grinding wheel applied to an inner ring after heat treatment.

FIG. 5 is a longitudinal section view of a second embodiment of the vehicle wheel bearing apparatus.

FIG. 6 is a longitudinal section view of a third embodiment of the vehicle wheel bearing apparatus.

FIG. 7 is a longitudinal section view of a wheel bearing of the prior art.

FIG. 8 is an enlarged view of a portion of the wheel bearing of FIG. 7.

DETAILED DESCRIPTION

Preferable embodiments of the present disclosure will be described with reference to the drawings.

FIG. 1 shows a first embodiment of a vehicle wheel bearing apparatus. FIG. 2 is a longitudinal section view of a wheel bearing used in the bearing apparatus of FIG. 1. FIG. 3(a) is an enlarged view of FIG. 2. FIG. 3(b) is a further enlarged view of FIG. 3(a). FIG. 4 is a schematic view of a grinding wheel applied to an inner ring after heat treatment. In the description below, the term "outboard side" (left hand side in the drawings) of the apparatus denotes a side that is positioned outside of the vehicle body. The term "inboard side" (right hand side in the drawings) of the apparatus denotes a side which is positioned inside of the body when the bearing apparatus is mounted on the vehicle body.

The vehicle wheel bearing apparatus disclosure shown in FIG. 1 is of a first generation type used for a driving wheel. The apparatus includes, as main components, a wheel hub 1 and a wheel bearing 3 to rotatably support the wheel hub 1 relative to a knuckle 2. The wheel hub 1 is integrally formed with a wheel mounting flange 4 at one end. A cylindrical portion 5 extends from the wheel mounting flange 4. Hub bolts 4a, to secure a wheel (W) and a brake rotor (B), are equidistantly arranged along the outer circumference of the wheel mounting flange 4. A serration (or spline) 6 is formed on the inner circumferential surface of the wheel hub 1. A wheel bearing described below is press fit onto the outer circumferential surface of the cylindrical portion 5 of the wheel hub 1.

The wheel hub 1 is made of medium carbon steel including carbon of 0.40~0.80% by weight such as S53C. It is hardened by high frequency induction quenching so that a region from the base of the wheel mounting flange 6, at its inboard side, to the cylindrical portion 5 has a surface hardness of 58~4 HRC. This improves the mechanical strength against the rotational bending load applied to the wheel mounting flange 4. It also improves the anti-fretting performance of the cylindrical portion 5 on which the wheel bearing 3 is press fit. Accordingly, the durability of the wheel hub 1 can be further enhanced.

The wheel bearing 3 is secured on the wheel hub 1 by being sandwiched by a shoulder 9 of an outer joint member 8 forming a constant velocity universal joint 7 and the wheel hub 1. The outer joint member 8 is integrally formed with a stem portion 10. The stem portion 10 is formed with a serration (or spline) 10a on its outer circumferential surface and a thread portion 10b. Torque from an engine can be transmitted to the wheel hub 1, via a driving shaft (not shown), the constant velocity universal joint 7 and the serration 10a of the stem portion 10. A desirable bearing preload can be applied to the wheel bearing 3 by fastening a securing nut 11 onto the thread portion 10b at a predetermined fastening torque.

As shown in an enlarged view of FIG. 2 the wheel bearing 3 is a back-to-back double row angular contact ball bearing. It includes an outer ring (outer member) 12, a pair of inner ring (inner member) 13, 13 fitted in the outer ring 12, and double row balls 14, 14 contained between the outer and inner rings 12, 13. The front face ends of the inner rings 13, 13 abut one another.

The outer ring 12 is made of high carbon chrome bearing steel such as SUJ 2. It is formed with double row outer raceway surfaces 12a, 12a on its inner circumferential surface. The inner ring 13 is made of high carbon chrome bearing such as SUJ 2. It is formed with inner raceway surface 13a, corresponding to one of the outer raceway surfaces 12a, 12a on its outer circumferential surface. A plurality of balls 14, 14 is rollably contained between the outer and inner raceway surfaces 12a, 13a. Cages 15, 15 hold the balls 14 in position. Seals 16, 17 are arranged at both ends of the wheel bearing 3 to prevent leakage of grease contained within the bearing 3. Additionally, the seals 16, 17 prevent entering of rain water or dusts into the bearing 3.

As clearly shown in an enlarged view of FIGS. 3(a) and (b), the inner ring 13 is formed with a counter portion 18 near the bottom of the inner raceway surface 13a. The counter portion 18 has a predetermined width and a diameter larger than that of the bottom diameter (d1) of the inner raceway surface. The counter portion 18 includes a cylindrical portion 18a axially extending from the inner raceway surface 13a. A tapered surface 18b converges from the cylindrical portion 18a toward a small end face 13b. A smaller cylindrical portion 19 further extends from the tapered surface 18b. The outer diameter (d2) of the counter portion 18 is formed to have a diameter larger than, by a predetermined "run-over height" δ (one side), the inscribed circle diameter (d0) of the balls under a supposed condition where the balls 14 are perfectly held within the outer raceway surface 12a as if they would be contacted with the bottom of the outer raceway surface 12a (i.e., d2=d0+2δ). The inclination angle θ of the tapered surface 18b is set at or less than 5°. This makes it possible to smoothly lead the balls 14 from the tapered surface 18b to the cylindrical portion 18a and thus to effectively prevent the generation of scratch damage onto the balls 14 during assembly of the wheel bearing 3.

The counter portion 18 is formed by a formed grinding wheel with a predetermined configuration and dimension. As shown in FIG. 4, in this embodiment, a larger outer diameter 20, the counter portion 18 and the smaller end face 13b are formed by the formed grinding wheel 21 together with the inner raceway surface 13a. The outer diameter (d2) of the counter portion 18 is limited within a predetermined value range so that the run-over height δ of the counter portion 18 is included within a predetermined tolerance range. A transition (A) between the inner raceway surface 13a and the counter portion 18 is rounded by a circular arc having a predetermined radius of curvature (R). A transition (corner portion) between the cylindrical portion 18a and the tapered portion 18b is rounded to have a circular arc and is smoothly continuous. This makes it possible to prevent the generation of burrs and to form the outer diameter (d2) of the counter portion 18 with a high accuracy and without dispersion of dimension. Accordingly, it is possible to provide a vehicle wheel bearing apparatus that can prevent the generation of ball damage and contact of the balls against the edge of the counter portion during transportation of the wheel bearing and assembly of the wheel bearing to the vehicle wheel bearing apparatus. Thus, it can prevent the NVH problem and improve the life of bearing apparatus.

FIG. 5 is a longitudinal view of a second embodiment of the wheel bearing apparatus. The same reference numerals are used to designate the same parts as those having the same functions used in the first embodiment.

This bearing apparatus is a second generation type used for a driven wheel. It has a wheel hub (outer member) 22, a pair of inner rings 13, 13, double row balls 14, 14 freely rollably contained between the wheel hub 22 and the inner ring 13 via cages 15, and seals 17, 17 arranged at both ends of the wheel hub 22.

The wheel hub 22 is made of medium carbon steel including carbon of 0.40~0.80% by weight such as S53C. It is formed, on its outboard side end, with a wheel mounting flange 4 and with double row outer raceway surfaces 12a, 12a on its inner circumferential surface. A region including the base of the wheel mounting flange 4, at its inboard side, and the double row outer raceway surfaces 12a, 12a is hardened by high frequency induction quenching to have surface hardness of 58~64 HRC.

Also in this embodiment, the counter portion 18 has a predetermined run-over height δ. It is formed by a formed grinding wheel so that the counter portion 18 has a predetermined configuration and dimension. This makes it possible to prevent the generation of burrs and to form the outer diameter of the counter portion 18 with high accuracy and without dispersion of dimension.

FIG. 6 is a longitudinal view of a third embodiment of the wheel bearing apparatus. This embodiment is different from the previous embodiments only in the structure of the wheel bearing. The same reference numerals are used to designate the same parts as those having the same functions used in the previous embodiments.

This bearing apparatus is a third generation type used for a driving wheel. It has an inner member 23, an outer member 24, and double row balls 14, 14 freely rollably contained between the outer and inner members 23, 24. The inner member 23 includes a wheel hub 25 and the inner ring 13 is press fit onto the wheel hub 25, via a predetermined interference.

The wheel hub 25 is integrally formed with a wheel mounting flange 4 at its outboard side end. An inner raceway surface 25a is formed on its outer circumferential surface. A cylindrical portion 25 extends from the inner raceway surface 25a. In addition, a serration (or spline) 25c is formed on the inner circumferential surface for torque transmission.

The outer member 24 is integrally formed with a body mounting flange 24 on its outer circumferential surface. The body mounting flange 24a is mounted on a body (not shown) of a vehicle. Additionally, the outer member is formed with double row outer raceway surfaces 12a, 12a on its inner circumferential surface. Seals 26, 27 are arranged at both ends of the outer member 24 to prevent leakage of grease contained within the bearing apparatus. Also, the seals 26, 27 prevent the entering of rain water or dusts into the bearing apparatus.

The wheel hub 25 is made of medium carbon steel including carbon of 0.40~0.80% by weight such as S53C. It is hardened by high frequency induction quenching so that a region, including a seal land portion on which the outboard side seal 26 contacts, the inner raceway surface 25a, and the cylindrical portion 25b has a surface hardness of 58~64 HRC.

The outer member 24 is made of medium carbon steel including carbon of 0.40~0.80% by weight such as S53C. It is hardened by high frequency induction quenching so that the double row outer raceway surface 12a, 12a has a surface hardness of 58~64 HRC.

After heat treatment, the counter portion 18 is formed on the wheel hub 25 and the inner ring 13 by a formed grinding wheel. Thus, the counter portion 18 has a predetermined configuration and dimension. This makes it possible to prevent the generation of burrs and to form the counter portion 18 with high accuracy and without dispersion of dimension.

In this bearing apparatus of the third generation, since the inner ring 13 is press fit onto the cylindrical portion 25b of the wheel hub 25, the inner ring 13 does not move or vibrate itself after or during assembly of the bearing apparatus, transportation or assembly of the bearing apparatus to a vehicle at an automobile manufacturer. Thus, the counter portions 18 to prevent the coming-out of the inner ring 13 is not necessary, the provision of the counter portion 18 makes it possible to easily and accurately seek out the bottom of the inner raceway surface 13a of the inner ring 13 and the inner raceway surface 25a of the wheel hub 25 during a measuring step.

The vehicle wheel bearing apparatus provided with the counter portion can be applied to bearing apparatus of first, second and third generations regardless of it, it is used either for the driving wheel or for driven wheel.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A vehicle wheel bearing apparatus comprising:
   an outer member with double row outer raceway surfaces formed on its inner circumferential surface with double row outer raceway surfaces;
   inner members each formed with an inner raceway surface on its outer circumferential surface, said inner raceway surfaces facing opposite to the double row outer raceway surfaces, double row balls are freely rollably contained between the outer raceway surfaces and inner raceway surfaces;
   a counter portion is formed near the bottom of each inner raceway surface, said counter portion has an outer diameter larger than, by a predetermined run-over height, an inscribed circle diameter of balls under a supposed condition where the balls are perfectly held within the outer raceway surface as if they would be contacted with the bottom the outer raceway surface, said counter portion is formed by a cylindrical portion axially extending from each inner raceway surface;
   a tapered portion converges toward the end face of each inner members, a smaller cylindrical portion extends from the tapered portion in a direction away from said counter portion, said raceway surfaces is a ground surface, said cylindrical portion is a ground surface and said tapered portion is a ground surface; and
   transitions between the counter portion and the inner raceway surface as well as between the cylindrical portion and the tapered portion are rounded and smoothly continuous to effectively prevent the generation of scratches onto the balls during assembly of said wheel bearing.

2. The vehicle wheel bearing apparatus of claim 1 wherein the counter portion is ground simultaneously with the grinding surfaces by a formed grinding wheel.

3. The vehicle wheel bearing apparatus of claim 1, wherein the outer diameter of the counter portion is limited within a predetermined value range so that the run-over height of the counter portion is included within a predetermined tolerance range.

4. The vehicle wheel bearing apparatus of claim 1, wherein the angle of inclination of the tapered surface is set at or less than 5°.

5. The vehicle wheel bearing apparatus of claim 1, wherein the inner member includes a wheel hub having an integrally formed wheel mounting flange at one end, said wheel hub formed with one inner raceway surface on its outer circumferential surface, said one inner raceway surface oppositely facing one of said double row outer raceway surfaces, said wheel hub integrally formed with a cylindrical portion axially extending from the inner raceway surface, an inner ring formed with the outer inner raceway surface on its outer circumferential surface, said other inner raceway surface oppositely facing the other of said double row outer raceway surfaces, and said counter portion is formed the inner raceway surfaces of the wheel hub and the inner ring, respectively.

* * * * *

UNITED STATES PATENT AND TRADEMARK OFFICE
CERTIFICATE OF CORRECTION

PATENT NO. : 7,648,283 B2  Page 1 of 1
APPLICATION NO. : 12/052067
DATED : January 19, 2010
INVENTOR(S) : Kazuo Komori It is certified that error appears in the above-identified patent and that said Letters Patent is hereby corrected as shown below:

Column 5
line 27 "58~4 HRC" should be --58~64 HRC--.

Column 8
line 25 after "bottom", insert --of--.

Signed and Sealed this

Eighteenth Day of May, 2010

David J. Kappos
*Director of the United States Patent and Trademark Office*